(12) United States Patent
Eckholz

(10) Patent No.: US 9,689,499 B2
(45) Date of Patent: Jun. 27, 2017

(54) CONTROL VALVE

(71) Applicant: SAMSON AG, Frankfurt am Main (DE)

(72) Inventor: Holger Eckholz, Brechen (DE)

(73) Assignee: SAMSON AG, Frankfurt am Main (DE)

( * ) Notice: Subject to any disclaimer, the term of this patent is extended or adjusted under 35 U.S.C. 154(b) by 0 days.

(21) Appl. No.: 14/804,254

(22) Filed: Jul. 20, 2015

(65) Prior Publication Data

US 2016/0018007 A1 Jan. 21, 2016

(30) Foreign Application Priority Data

Jul. 21, 2014 (DE) ......................... 10 2014 110 246

(51) Int. Cl.
*F16K 1/42* (2006.01)
*F16K 1/36* (2006.01)
(Continued)

(52) U.S. Cl.
CPC ................. *F16K 1/42* (2013.01); *F16K 1/36* (2013.01); *F16K 1/38* (2013.01); *F16K 1/422* (2013.01); *F16K 25/005* (2013.01); *F16K 47/04* (2013.01)

(58) Field of Classification Search
CPC ..... F16K 1/36; F16K 1/38; F16K 1/42; F16K 1/422; F16K 47/04; F16K 25/005
(Continued)

(56) References Cited

U.S. PATENT DOCUMENTS 2,706,490 A 4/1955 Grieshaber et al.
2,866,477 A 12/1958 Bredtschneider et al.
(Continued)

FOREIGN PATENT DOCUMENTS

BE 1009354 A6 2/1997
DE 1294767 5/1969
(Continued)

OTHER PUBLICATIONS

European Patent Office, Search Report, Dec. 15, 2015, p. 1-6, Application No. 15177705.9, Applicant: Samson AG.

*Primary Examiner* — John K Fristoe, Jr.
*Assistant Examiner* — Ian Paquette
(74) *Attorney, Agent, or Firm* — Woodling, Krost and Rust

(57) ABSTRACT

The invention relates to a control valve (10) for controlling a fluid flow, comprising a valve housing (22) and a positioning element (12) which can be translationally moved and which includes a shut-off portion (14, 70) and a throttle portion (16), with a valve seat being furthermore provided which includes a sealing portion (18, 44) and a throttle opening portion (28, 46), with the shut-off portion (14, 70) of said positioning element (12) being adapted to cooperate with the sealing portion (18, 44) of the valve seat (20, 40) so as to enable shut-off of the fluid flow, and with the throttle portion (16) of the positioning element (12, 54) being adapted to cooperate with the throttle opening portion (28, 46) of the valve seat (20, 40, 60) so as to enable the setting of a defined fluid flow, with at least the surfaces of the throttle opening (28) and the sealing portion (18, 44) being furthermore made of the same hard material. The invention is characterized in that the valve seat is designed as a valve seat insert (20, 40, 60) which includes the throttle opening
(Continued)

portion (28, 46) and the sealing portion (18, 44), said insert being inserted into the valve housing.

8 Claims, 3 Drawing Sheets

(51) Int. Cl.
*F16K 47/04* (2006.01)
*F16K 1/38* (2006.01)
*F16K 25/00* (2006.01)

(58) Field of Classification Search
USPC .................... 251/118, 120, 121, 122, 368
See application file for complete search history.

(56) References Cited

U.S. PATENT DOCUMENTS

| | | | |
|---|---|---|---|
| 3,521,852 A | | 7/1970 | Gillis |
| 3,765,448 A | * | 10/1973 | Dussia ................ F16K 1/38 |
| | | | 137/553 |
| 4,047,695 A | | 9/1977 | Cleveland et al. |
| 4,732,364 A | * | 3/1988 | Seger .................. E21B 34/02 |
| | | | 251/122 |
| 5,350,205 A | * | 9/1994 | Aldridge ............. F16L 19/02 |
| | | | 285/321 |
| 7,137,612 B2 | * | 11/2006 | Baca ...................... F16K 1/38 |
| | | | 251/122 |
| 8,051,874 B2 | * | 11/2011 | McCarty ............ F16K 25/005 |
| | | | 137/375 |
| 9,115,814 B2 | * | 8/2015 | Sun ........................ F16K 1/42 |
| 2011/0226980 A1 | | 9/2011 | Richardson et al. |
| 2015/0086795 A1 | * | 3/2015 | Giddings .................. C08J 7/06 |
| | | | 428/446 |

FOREIGN PATENT DOCUMENTS

| | | |
|---|---|---|
| DE | 2457964 A1 | 6/1976 |
| DE | 3148521 | 6/1982 |
| DE | 19602796 A1 | 8/1996 |
| DE | 69512223 | 2/2000 |
| EP | 0224345 | 10/1990 |
| EP | 1757850 A1 | 2/2007 |
| EP | 2547936 | 1/2014 |
| GB | 835367 | 5/1960 |
| WO | 2004092622 | 10/2004 |

\* cited by examiner

CONTROL VALVE

The invention relates to a control valve of the type specified in the preamble of claim 1.

Document EP 2 547 936 B1 discloses a non-ceramic valve seat having a ceramic bush insert, with a positioning element being provided which has a closing member with a shut-off portion that cooperates with the valve seat to achieve a shut-off effect, and which has a ceramic throttle portion that cooperates with the ceramic bush insert.

Document DE 31 48 521 A1 discloses a throttle valve which has a super-hard coating applied on stainless steel in the area of the throttle opening. This approach is disadvantageous in that when this layer has worn down, the valve will have to be replaced.

It is the object of the invention to provide a control valve having a throttle function and a shut-off function for which a long service is to be achieved, in particular if the valve is exposed to abrasive media in operation.

In a known manner, a control valve for controlling a fluid flow comprises a valve housing and a positioning element which has a shut-off portion and a throttle portion. The shut-off portion of the positioning element may preferably be cone-shaped. The throttle portion which is notably located downstream of the shut-off portion, in the direction of the valve seat, may be of a cylindrical basic design with a tapered portion. Furthermore, a valve seat is provided which has a sealing portion and a throttle opening portion, said shut-off portion of the positioning element cooperating with the sealing portion of the valve seat so as to enable a shut-off of the fluid flow, and the throttle portion of the positioning element cooperating with said throttle opening portion of the valve seat so as to enable setting a defined fluid flow. Preferably, the sealing portion may include a conical chamfer. Specifically, the throttle opening portion is designed in the form of a hollow cylindrical element. Furthermore, at least the surfaces of the throttle opening portion and the sealing portion are made of the same hard material.

According to the invention, the valve seat is designed in the form of a valve seat insert which consists of the throttle opening portion and the sealing portion, said valve seat insert being inserted into the valve housing.

The valve seat insert may be indirectly or directly inserted into the valve housing.

The advantage of this design—especially when highly abrasive media are made to pass through a valve seat insert which has a hard material coating—is that the valve service life can be increased by replacing the valve seat, in addition to the hard coating.

Specifically, the hard material is of a hardness of more than 65 HRC. The hard material may be ceramic, hard metal or stellite. It may also be made of a hardened material. Preferably, the valve seat insert may be integrally formed from a solid material.

The design may also provide for a diameter of the sealing edge formed by the sealing portion and the shut-off portion which is larger than the diameter of the opening in the throttle opening portion.

It is considered particularly advantageous to provide the shut-off portion of the positioning element with a material which is at least 10 HRC (Rockwell) less in hardness than the hardness of the hard material of the valve seat insert. This will increase the tightness of the valve, and it is preferred not to have the soft sealing edge located in the main flow area of the valve.

The valve seat insert may preferably be integrally formed from a single material. In a preferred embodiment, the hard material of the valve seat insert may be made of ceramic, hard metal or stellite.

Furthermore, the throttle portion of the positioning element may comprise a hardened material of a hardness of more than 70 HRC. If the throttle opening portion is also made of a material of a hardness of more than 70 HRC, then this will ensure that the throttle portion of the positioning element and the throttle opening portion in the valve seat will be exposed to the same load.

In an embodiment which is considered particularly advantageous, the positioning element may comprise two parts, where the shut-off portion of the positioning element comprises a material of a hardness of less than 50 HRC, and its throttle portion comprises a hard metal, ceramic, stellite and/or a material of a hardness of more than 65 HRC. In combination with forming the valve seat insert from a hard metal, ceramic, stellite and/or a material of a hardness of more than 65 HRC, this will result in a high degree of wear resistance and optimal sealing capacity at the same time. The softer material of the shut-off portion will significantly reduce the risk of breakage of the hard and thus brittle material due to the high contact pressures and impact stresses during operation. The fact that the valve seat insert and the positioning element can be exchanged clearly prolongs the service life of the control valve even after damage to the valve seat insert.

In an embodiment which is considered particularly advantageous, both the throttle portion of the positioning element and the valve seat insert are made of a ceramic material.

Preferably, the throttle portion may include an idle stroke section and a control section. In the idle stroke section, which is located between the control section and the shut-off portion, a change in position of the positioning element with respect to the throttle opening will not result in any significant change in the flow behaviour. It is to be noted that the throttle opening portion and the sealing portion are spaced from each other as viewed in the stroke direction.

The shut-off portion may thus be spaced from the sealing portion of the positioning element by the length of the idle stroke section before the fluid flow is finally released by the control section. Consequently, there will be a lower pressure difference on the shut-off and sealing portions, which will thus ultimately reduce wear on this area.

Furthermore, the throttle portion and the shut-off portion of the positioning element may advantageously be of a two-part design. Specifically, the throttle portion is made of a ceramic material and the shut-off portion is made of a soft metal. In the transition zone, an elastic element such as graphite, or an elastomeric element may be disposed which will protect the ceramic parts from impact stresses and may also improve tolerance compensation. Such an elastic transition design may also be provided for the transition zone between the shut-off portion and the rest of the positioning element, in particular the adjusting rod. The elements connected via the elastic transition zone may be attached thereto through flanging, press-fitting, clamping, gluing, or soldering.

According to yet another advantageous embodiment, the valve seat insert may be inserted into the valve housing via an intermediate bush. Specifically, the valve seat insert may be press-fitted or glued into the intermediate bush, or fixed by means of retaining elements and/or may be elastically mounted in an axial direction. The intermediate bush may come in various different designs, and may be press-fitted into the valve housing, or fixed therein by retaining rings, or may take the form of a threaded bush with a screw thread which is screwed into the valve housing.

The specific design of an intermediate bush makes it very easy to exchange the valve seat insert in the valve housing.

Additional advantages, features and possible applications of the present invention may be gathered from the description which follows, in which reference is made to the embodiments illustrated in the drawings.

Throughout the description, the claims and the drawings, the terms and associated reference signs correspond to those listed in the List of Reference Signs below. In the drawings, FIG. 1 is a schematic sectional view of a control valve according to the invention, in a sealing operating mode thereof;

Figure 1:
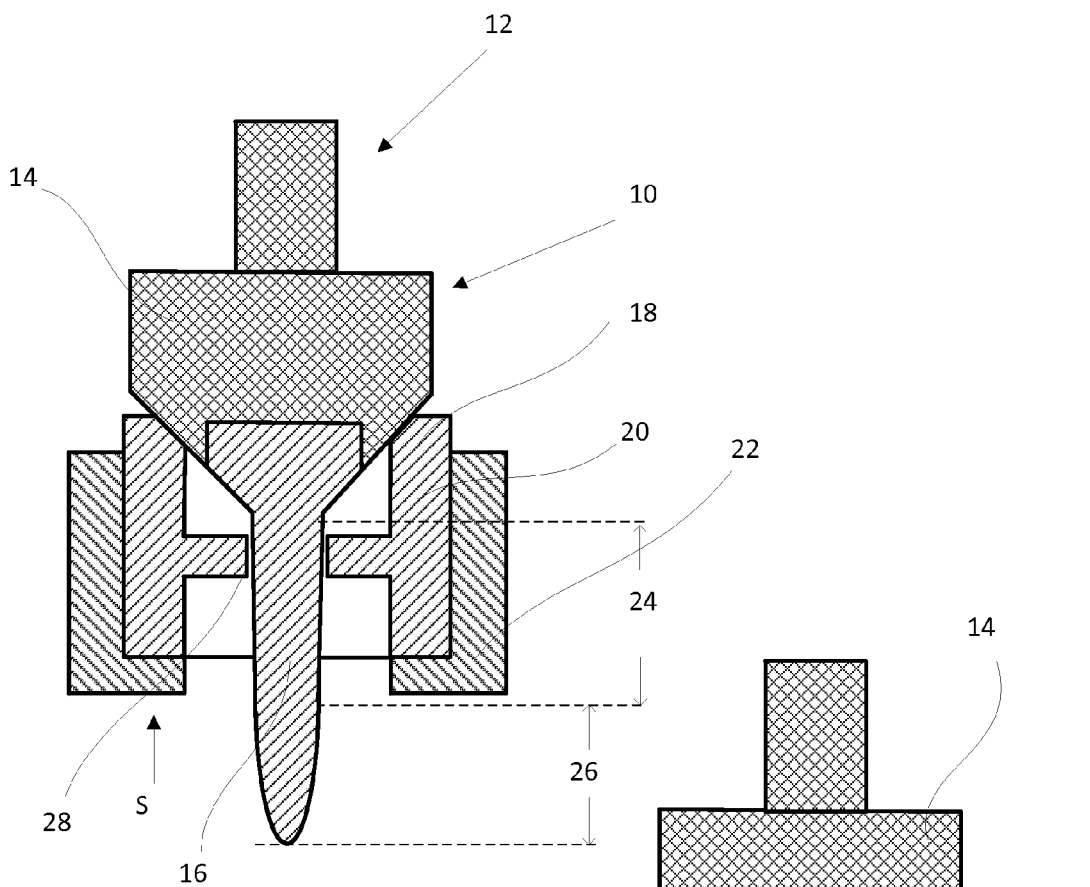

Shown in the schematic sectional view of FIG. 1 is a control valve 10 according to the invention, in a sealing operating mode thereof. The control valve 10 comprises a positioning element 12 which can be translationally moved and which can cooperate with a valve seat insert 20. The positioning element comprises a shut-off portion 14, for its sealing mode of operation, and a throttle portion 16, for its controlling mode of operation.

The shut-off portion 14 of the positioning element 12 is made of a soft metal of a Rockwell hardness of less than 50 RHC. The valve seat insert 20, which is made of a ceramic material, is inserted into the schematically shown valve housing 22.

When the shut-off portion 14 contacts the sealing portion 18 of the valve seat insert 20, then this will prevent a flow therethrough. However, a certain amount of leakage within the leakage class cannot be prevented. The throttle portion 16 comprises an idle stroke section 24 as well as a control section 26. If the positioning element 12 has its idle stroke section 24 at the level of the throttle opening 28, the specific design of the idle stroke section 24 is to ensure that the flow rate remains almost unchanged at any position of the positioning element within the idle stroke section 24. The flow rate will depend on the flow area between the throttle opening 28 and the diameter of the positioning element in the idle stroke section 24.

Figure 2:
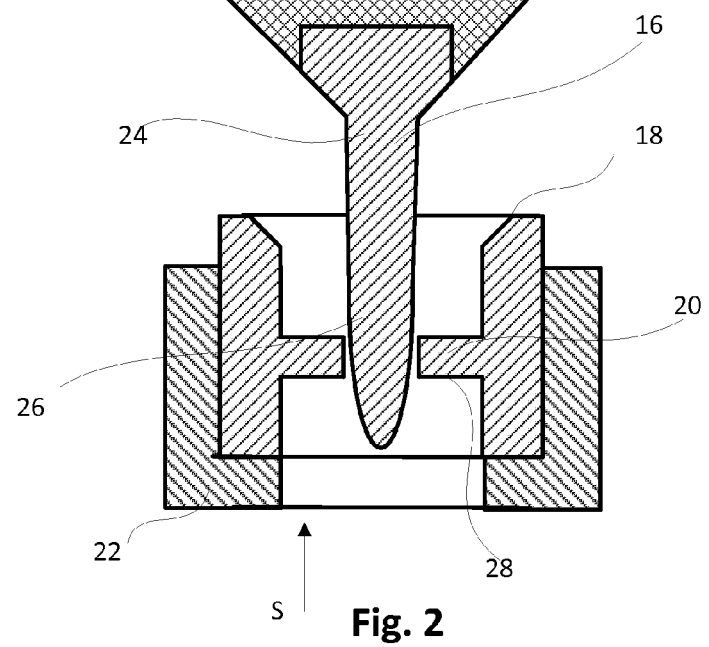
FIG. 2 is a schematic sectional view of a control valve according to the invention, in a controlling operating mode thereof.

Deliberate modulation of the flow rate will be possible as soon as the control section 26 is at the level of the throttle opening 28, as is shown in FIG. 2.

FIG. 2 is a view of the throttle portion 16 made of ceramic in an operating mode for controlling a flow S. As can be seen from FIG. 2, owing to the idle stroke section 24, the shut-off portion 14 has already been spaced from the sealing portion 18 of the valve seat insert 20 when fluid flow control starts. The idle stroke section 24 should be sufficiently dimensioned to ensure that the cross-section of the opening of the sealing portion 18 is larger than the flow area in the idle stroke section 24 before the flow is deliberately modulated at the control section 26. The fact that the shut-off portion 14 and the sealing portion 18 of the valve seat insert 20 are spaced from each other helps prevent wear on the shut-off portion 14, which latter is made of a softer metal than the valve insert 20.

The throttle portion 16 which is exposed to the flow, especially its control section 26, is also made of a ceramic material, which effectively prevents wear of the positioning element, due to the hardness of the material. Both the throttle opening portion 46 and the sealing portion 18 of the valve seat insert 20 are made of a ceramic material. The valve seat insert 20 is directly inserted into the valve housing 22.

Figure 3:
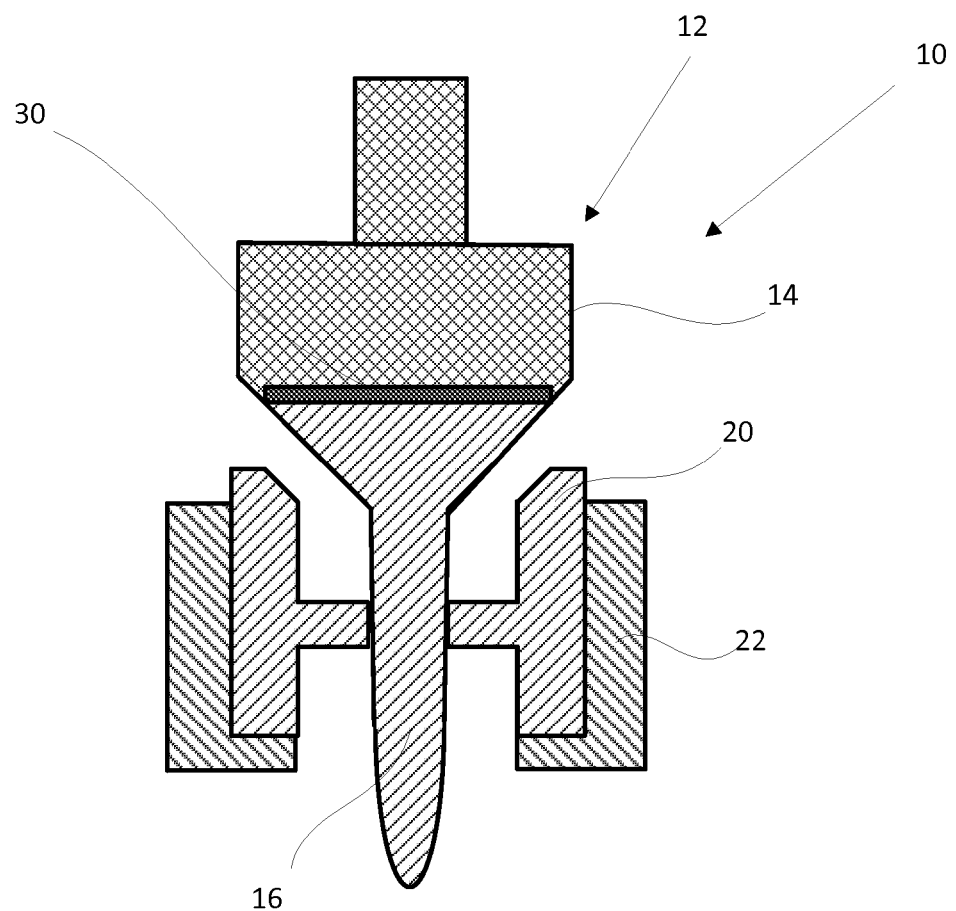
FIG. 3 is a schematic sectional view of a control valve according to the invention having an elastic connection of the sealing portion, in a terminated operating mode thereof.

FIG. 3 is a sectional view of a positioning element 12 having a valve seat 20 which is inserted into a valve housing 22.

Contrary to the embodiment shown in FIG. 1 and FIG. 2, the embodiment illustrated in FIG. 3 has an elastic element 30 between the shut-off portion 14 and the rest of the positioning element. In this embodiment, the shut-off portion 14 of the positioning element is likewise made of a ceramic material. The fact that the shut-off portion 14 of the positioning element is connected via an elastic element 30 makes it possible to reduce the pressure acting on the shut-off portion 14 and the sealing portion 20, which in turn improves the breaking strength of the brittle hard metal or the ceramic material.

Figure 4:
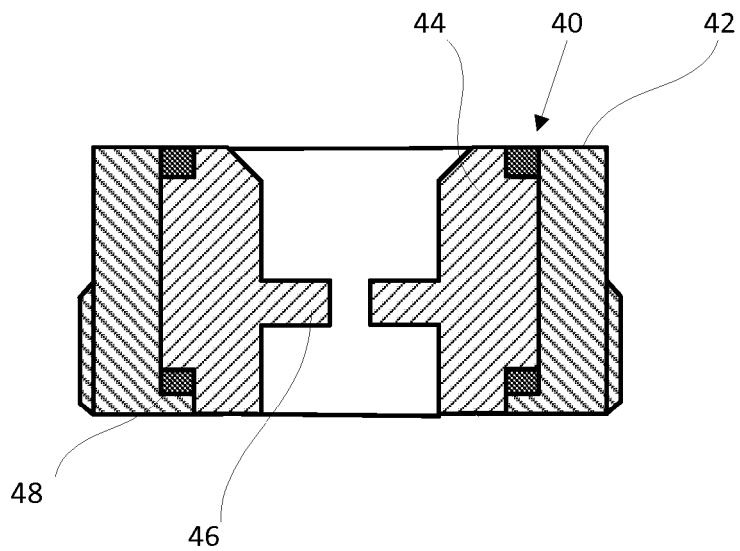
FIG. 4 is a schematic sectional view of a control valve according to the invention comprising the valve seat.

FIG. 4 is a sectional view of a threaded bush 42 according to the invention which has a valve seat insert 40 made of hard metal or a ceramic material press-fitted into it, said valve seat 40 forming the sealing portion 44 and the throttle opening portion 46. A threaded bush 42 is considered a particularly advantageous design for an intermediate bush.

The valve seat insert 40 is elastically supported on the threaded bush 42 via an elastic ring 48 and is secured against falling out by means of a retaining ring, for example. Any impact stresses or excessive surface pressures caused by the positioning element may thus be absorbed—which considerably improves the durability of the brittle valve seat insert 40. Especially if the shut-off portion of the positioning element is also made of a very hard material, such a threaded bush 42 design may considerably increase the service life of the valve seat 90. The threaded bush 42 may be screwed into the valve seat via a complementary thread.

Figure 5:
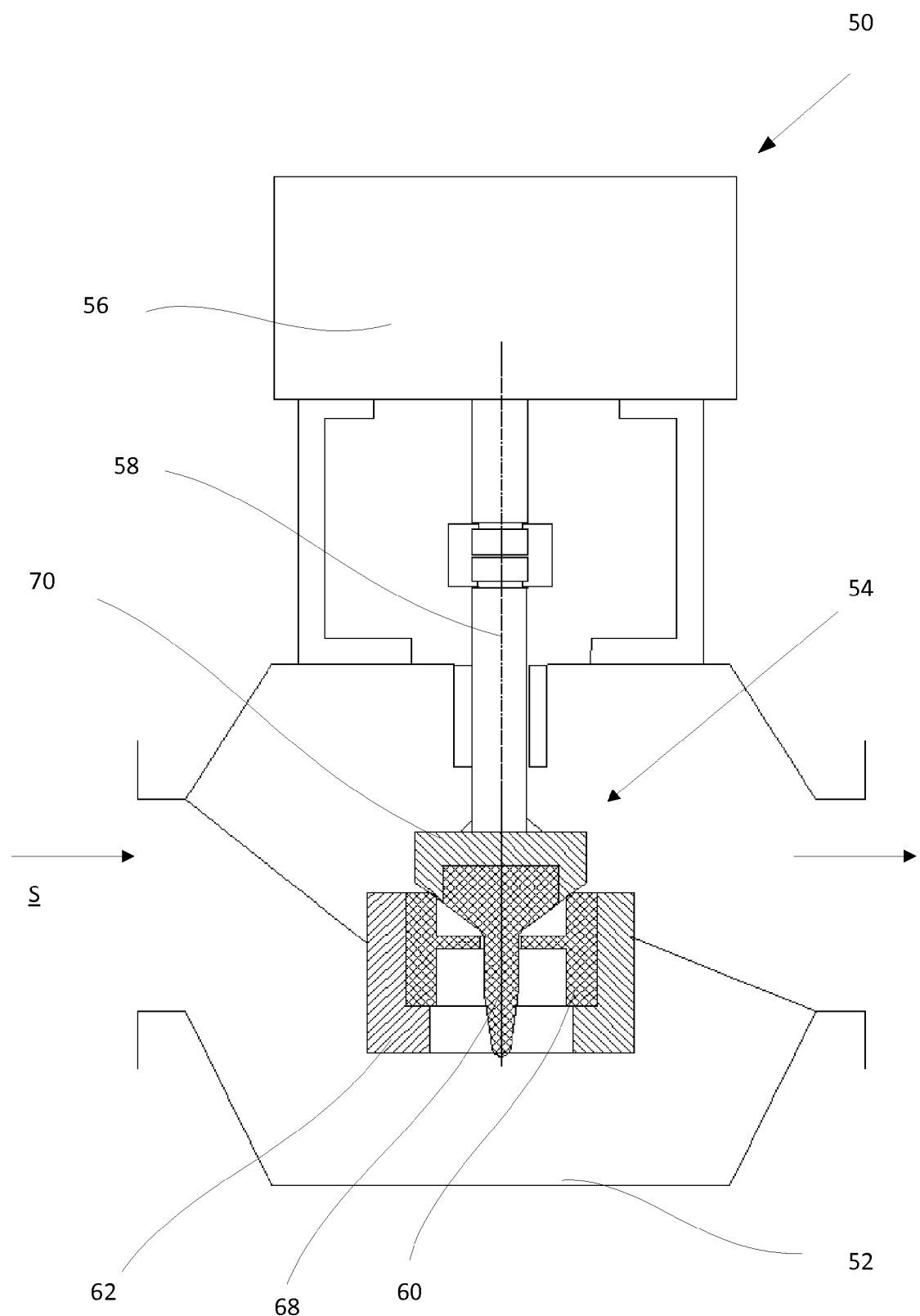
FIG. 5 is a schematic sectional view of a control valve according to the invention comprising a threaded bush of an inserted valve seat insert.

FIG. 5 is a schematic view of a control valve 50. The control valve 50 comprises a valve housing 52 and a positioning element 54, which is coupled to an actuator 56 via an adjusting rod 58. The positioning element 54 cooperates with a valve seat insert 60 located within the valve housing 52. As illustrated in the preceding drawings, the valve seat insert 60 is inserted into the valve housing 52 via an intermediate bush 62. In this embodiment, the positioning element 54 is of a two-part design and has a throttle portion 68 and a shut-off portion 70. The shut-off portion 70 is made of a material which is softer by at least 10 HRC than the valve seat insert 60.

LIST OF REFERENCE SIGNS 10 control valve
12 positioning element
14 shut-off portion
16 throttle portion
18 sealing portion
20 valve seat
22 valve housing
24 idle stroke section
26 control section
28 throttle opening
30 elastic element 40 valve seat
42 threaded bush
44 sealing portion
46 throttle opening portion
48 elastic ring
50 control valve
52 valve housing
54 positioning element
56 actuator
58 actuating rod
60 valve seat insert
62 intermediate bush
68 throttle portion
70 shut-off portion

The invention claimed is:

1. Control valve (10) for controlling a fluid flow, comprising:
   a valve housing (22) and a positioning element (12) which can be translationally moved;
   said positioning element includes a shut-off portion (14, 70) and a throttle portion (16);
   a valve seat (20, 40) includes a sealing portion (18, 44) and a throttle opening portion (28, 46), with said shut-off portion (14, 70) of said positioning element (12) being adapted to cooperate with said sealing portion (18, 44) of said valve seat (20, 40) so as to enable shut-off of said fluid flow, and said throttle portion (16) of said positioning element (12, 54) being adapted to cooperate with said throttle opening portion (28, 46) of said valve seat (20, 40) so as to enable setting of a defined fluid flow;
   said throttle opening (28) includes surfaces;
   said surfaces of said throttle opening (28) and said sealing portion (18, 44) being made of the same hard material;
   an elastic element (48);
   said valve seat includes a valve seat insert;
   an intermediate bush (42);
   said valve seat insert is supported on said intermediate bush (42) through said elastic element (48);
   said valve seat insert includes said throttle opening portion (28, 46) and said sealing portion (18, 44);
   said valve seat insert is press-fitted in said intermediate bush (42); and,
   said intermediate bush is inserted in said valve housing (22).

2. The control valve of claim 1 wherein said valve seat insert is integrally formed from a solid material.

3. The control valve of claim 1 wherein said valve seat insert material is harder by at least 10 HRC than the material of said positioning element (12) in said shut-off portion (14).

4. The control valve of claim 1 wherein the material of said valve seat insert is a ceramic material, a hard metal, or stellite.

5. The control valve of claim 1 wherein said hard material is a hardened material of a hardness of more than 65 HRC.

6. The control valve of claim 1 wherein said throttle portion (16) of said positioning element (12) is made from ceramic, hard metal, or stellite.

7. The control valve of claim 1 wherein said throttle portion (16) includes an idle stroke section (24) and a control section (26), where any change in position of said positioning element (12) in said idle stroke section (24) relative to said throttle opening (28) will not result in a significant change of the flow behaviour, said idle stroke section (24) being located between said control section (26) and said shut-off portion (14).

8. Control valve (10) for controlling a fluid flow, comprising:
   a valve housing (22) and a positioning element (12) which can be translationally moved;
   said positioning element includes a shut-off portion (14, 70) and a throttle portion (16);
   a valve seat (20, 40) includes a sealing portion (18, 44) and a throttle opening portion (28, 46), with said shut-off portion (14, 70) of said positioning element (12) being adapted to cooperate with said sealing portion (18, 44) of said valve seat (20, 40) so as to enable shut-off of said fluid flow, and said throttle portion (16) of said positioning element (12, 54) being adapted to cooperate with said throttle opening portion (28, 46) of said valve seat (20, 40) so as to enable setting of a defined fluid flow;
   said throttle opening (28) includes surfaces;
   said surfaces of said throttle opening (28) and said sealing portion (18, 44) being made of the same hard material;
   an elastic element (48);
   said valve seat is designed as a valve seat insert;
   an intermediate bush (42);
   said valve seat insert is supported on said intermediate bush (42) through said elastic element (48);
   said valve seat insert includes said throttle opening portion (28, 46) and said sealing portion (18, 44);
   said valve seat insert is press-fitted into an intermediate bush (42); and,
   and said intermediate bush (42) is threaded into said valve housing (22).

* * * * *